Feb. 7, 1961 W. T. PETTERSON 2,970,550
LOCOMOTIVE BATTERY CHANGING MECHANISM
Filed June 8, 1959

INVENTOR
William T. Petterson
BY Alex. E. MacRae
ATTORNEY.

United States Patent Office 2,970,550
Patented Feb. 7, 1961

2,970,550

LOCOMOTIVE BATTERY CHANGING MECHANISM

William T. Petterson, % Bicroft Uranium Mines Ltd., R.R. 3, Bancroft, Ontario, Canada Filed June 8, 1959, Ser. No. 818,718

2 Claims. (Cl. 105—50)

This invention relates to changing mechanism for storage batteries of battery-powered locomotives.

Storage battery-powered locomotives are in widespread use, particularly in mining and tunnelling operations. The battery in such locomotives must, of course, be changed periodically for charging or replacement. In order to facilitate the changing procedure, it is conventional practice to support the battery box on rollers mounted on the chassis of the locomotive whereby the battery may be pushed off the locomotive. An angle iron retaining frame on the chassis extends around the base of the battery box. The battery box, when in operating position on the locomotive, continuously rides on such rollers. As a result, the rollers wear out quickly and must be frequently replaced. Moreover, the rollers constitute an unsteady support for the battery box during motion of the locomotive and the box is therefore subject to constant shifting from side to side of the chassis with a consequent unstable condition in the locomotive travel. Furthermore, during operation of the locomotive, sufficient dirt and other foreign matter frequently collects in the space between the battery box and the retaining frame to nullify the effect of the rollers and make it extremely difficult to push the battery off the locomotive.

It is an object of this invention to provide a battery changing apparatus for a battery-powered locomotive which is of simple, inexpensive structure, which permits rigid mounting of the battery box on the locomotive, which is quickly and readily operable to facilitate movement of a battery onto or off the locomotive, and which is capable of convenient installation on a locomotive.

Figure 1:
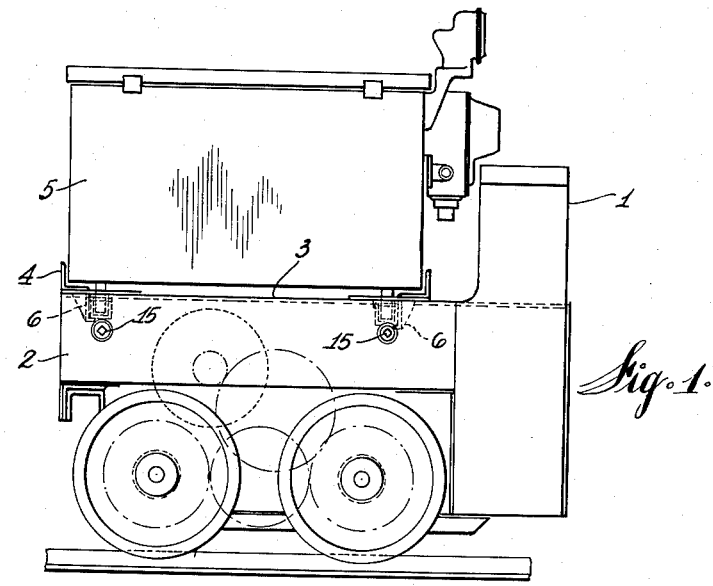
Figure 2:
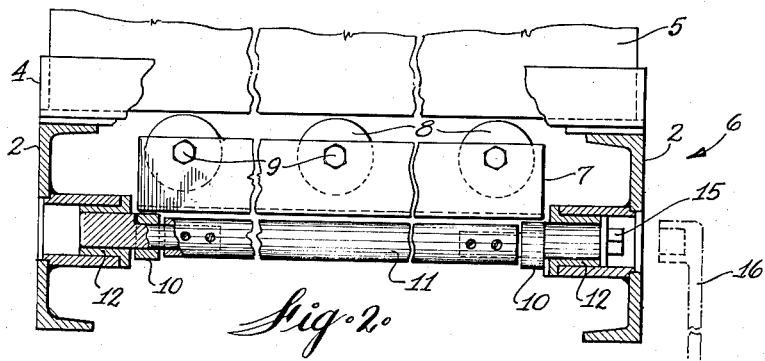
Figures 3, 4:
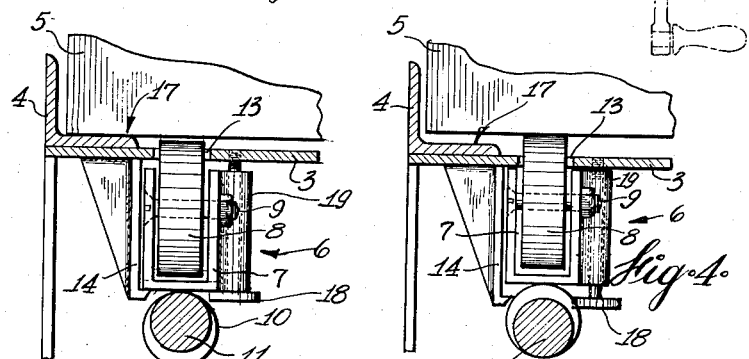

The invention will be described with reference to the accompanying drawing, in which:

Figure 1 is a side elevation of a battery locomotive having associated therewith apparatus in accordance with the invention, Figure 2 is an end elevation, partly in section, of the battery changing mechanism, Figure 3 is a partial sectional side elevation showing the mechanism in one position, and Figure 4 is a partial sectional side elevation showing the mechanism in another position.

In the drawing, 1 is a conventional storage battery locomotive having a chassis 2, a battery supporting platform 3, a battery retaining angle iron or like frame 4 on the platform, and a battery assembly 5. For convenience of description in the specification and claims, the battery assembly 5, comprising a box and a plurality of batteries therein, will be referred to as the battery.

A pair of transversely extending roller lift assemblies 6 are mounted on the chassis 2. Each assembly 6 comprises a channel or like member 7 having a plurality of rollers 8 rotatably mounted therein as by bolts 9. Each member 7 is supported below platform 3 on a pair of eccentrics 10 carried by a shaft 11, the ends of which are journalled in bearings 12 mounted in the chassis.

Portions of the rollers 8 project through openings 13 in the platform. It will be apparent that each member 7 and its associated rollers 8 are movable in an up and down direction in response to revolution of the shaft 11 and eccentrics 10, each member being guided in such movement by means of guide bars 14, as well as by means of pins 18 fixed to platform 3 and sleeves 19 fixed to members 7 and slidably engaging the pins.

Means for rotating shaft 11 and eccentrics 10 may comprise a square or like end portion 15 on the shaft and a wrench or tool 16.

The lowermost position of the rollers 8 is illustrated in Figure 3. In this position, the upper roller surfaces lie in a plane which is slightly below the plane of the surfaces 17 of the retaining frame 4 whereby the battery 5 rests solidly on such frame. This is the normal operating position of the battery on the locomotive. Since the rollers and roller lift assembly are free from contact with the battery, objectionable wear is substantially eliminated. Moreover, since the battery is rigidly supported, undesirable vibration and movement of the battery relatively to the frame 4 is avoided. Furthermore, there is very little opportunity for dirt to accumulate between the battery and the frame.

The uppermost position of the rollers is illustrated in Figure 4, in which position the upper roller surfaces are in a plane above the plane of surfaces 17 of the retainer frame 4 whereby the battery 5 rests on the rollers rather than on the frame. When a battery is to be taken off the locomotive, the shafts 11 are rotated to elevate the roller assemblies and free the battery from contact with the frame. The battery can then be rolled off in the usual manner, and another battery rolled into place on the locomotive, after which the roller assemblies are lowered to seat the battery on the frame 4.

It will be apparent that the range of up and down movement of the roller lift assemblies may be relatively small. Thus, this range may be of the order of approximately five-eighths inch.

I claim:

1. A storage battery locomotive comprising a wheeled chassis having a pair of longitudinally extending side frame members with a horizontally disposed floor resting thereon, said floor including a flat planar portion which is free of obstructions upon its top surface from side to side of said chassis, said floor portion having a pair of laterally spaced slots therethrough from the top to the bottom sides thereof and extending transversely of said chassis and with the ends of said slots terminating between and adjacent said side frame members, said slots having inner and outer sides respectively adjacent and remote from each other, a pair of guides, including vertical guide surfaces, secured to and supported solely by the underside of said floor and with each guide being disposed on the outer side of a slot and adjacent and parallel thereto, a pair of roller assemblies each having a member slidably engaging said vertical surface of one of said guides and each disposed for vertical movement relative to one of said slots, vertical guide pins secured to the underside of said floor in depending relation thereto, vertical guide sleeves fixed to said members and slidably receiving said guide pins whereby said vertical guide surfaces, pins and sleeves constrain said members for vertical movement toward and from said slots, each member having a plurality of longitudinally spaced and alined cylindrical rollers journaled therein and projecting thereabove, a battery retaining frame mounted upon the top surface of said floor with said slots disposed within the confines of said frame, pairs of oppositely disposed inwardly projecting sleeves carried by and opening through said frame members, each pair of sleeves having alined axes lying in a common vertical plane extending through one of said slots, a shaft for each pair of opposed sleeves, journals rotatably mounting the ends of said shaft in the associated pair of sleeves and with the ends of the shaft terminating within said sleeves, a connection on one end of said shaft for engagement through said opening in said frame member by a crank for rotating said shaft, eccentrics fixedly mounted on each of said shafts and upon which said members are supported, the position of said sleeves and the throw of said eccentrics being such that upon rotation of said shafts the top surfaces of said rollers may be selectively retracted below and raised through said slots above the battery retaining frame whereby a storage battery may be respectively rested on said retaining frame in stationary position or lifted thereabove upon said rollers for movement transversely of said floor portion.

2. A storage battery locomotive including a wheeled chassis including a pair of longitudinally extending side frame members, a horizontally extending floor supported upon said side frame members and having a flat planar upper surface which is completely unobstructed from side to side thereof, a retaining frame mounted upon and extending above said floor for supporting a storage battery, said floor having a pair of parallel slots therethrough, extending transversely thereof and terminating adjacent said side frame members, a pair of guide means carried by and rising above said retaining frame, extending transversely entirely across said floor and disposed on the relatively remote sides of said pair of slots for limiting movement of a storage battery when disposed between said guide means to movement transversely of said floor, a pair of guide members having each a vertical guide surface and secured in depending relation to the underside of said floor and being supported solely by the latter and being disposed parallel to and adjacent the relatively remote sides of said pair of slots, said side frame members having pairs of oppositely aligned sleeves secured to the inside of a frame member and having ends opening through the outside of said frame members, each pair of opposed sleeves projecting from said frame members towards each other and having alined axes lying in the same vertical plane with one of said slots, a pair of roller assemblies each including a casing having a vertical surface slidingly engaging said vertical guide surface of a guide member, each casing being disposed beneath one of said slots, a plurality of longitudinally, spaced and alined rollers each having its entire peripheral surface of cylindrical shape and journaled in each casing and with their top surfacs projecting above said casing, a pair of shafts each having its ends terminating within and being journaled for rotation in a pair of said opposed sleeves and having a connection on one end of each shaft for receiving a crank through the opening in said frame member for rotating said shaft, a pair of eccentrics fixedly mounted against rotational and axial movement of each shaft, each eccentric being closely adjacent to one of said pair of sleeves in which said shaft is journaled, said casings resting upon the eccentrics of said shafts, the position of said shafts and the throw of said eccentrics being such that the casings and rollers are selectively movable between a lowered position with the rollers retracted below said retaining frame and a raised position with the rollers projected upwardly through said slots for lifting a storage battery thereon above said retaining frame.

References Cited in the file of this patent

UNITED STATES PATENTS

| | | |
|---|---|---|
| 1,843,691 | Mancha et al. | Feb. 2, 1932 |
| 1,851,727 | Ponsonby | Mar. 29, 1932 |
| 2,021,503 | Fildes | Nov. 19, 1935 |